United States Patent [19]
Dunn

[11] 4,180,902
[45] Jan. 1, 1980

[54] HEAT EXCHANGER TUBE GUIDE AND EXTRACTOR TOOL THEREFOR

[75] Inventor: Robert E. Dunn, Franklin Boro, Pa.

[73] Assignee: Westinghouse Electric Corp., Pittsburgh, Pa.

[21] Appl. No.: 898,348

[22] Filed: Apr. 21, 1978

[51] Int. Cl.² ............................................. F28F 7/00
[52] U.S. Cl. ...................................... 29/726; 29/282; 29/283
[58] Field of Search ............ 214/1 BB, 1 BD; 29/726, 29/157.3 C, 157.4, 401 F, 418, 464, 272, 282, 283, 426, 427; 165/78

[56] References Cited

U.S. PATENT DOCUMENTS

| | | | |
|---|---|---|---|
| 3,906,607 | 9/1975 | Guser | 29/283 |
| 4,104,790 | 8/1978 | Hindrichs | 29/282 X |

*Primary Examiner*—Milton S. Mehr
*Attorney, Agent, or Firm*—F. A. Winans

[57] ABSTRACT

A tube guide for guiding replacement heat exchanger tubes into proper position within a tube sheet of a steam generator and an extractor tool for engaging the tube guide for extracting it from the tube once the tube is properly positioned.

6 Claims, 4 Drawing Figures

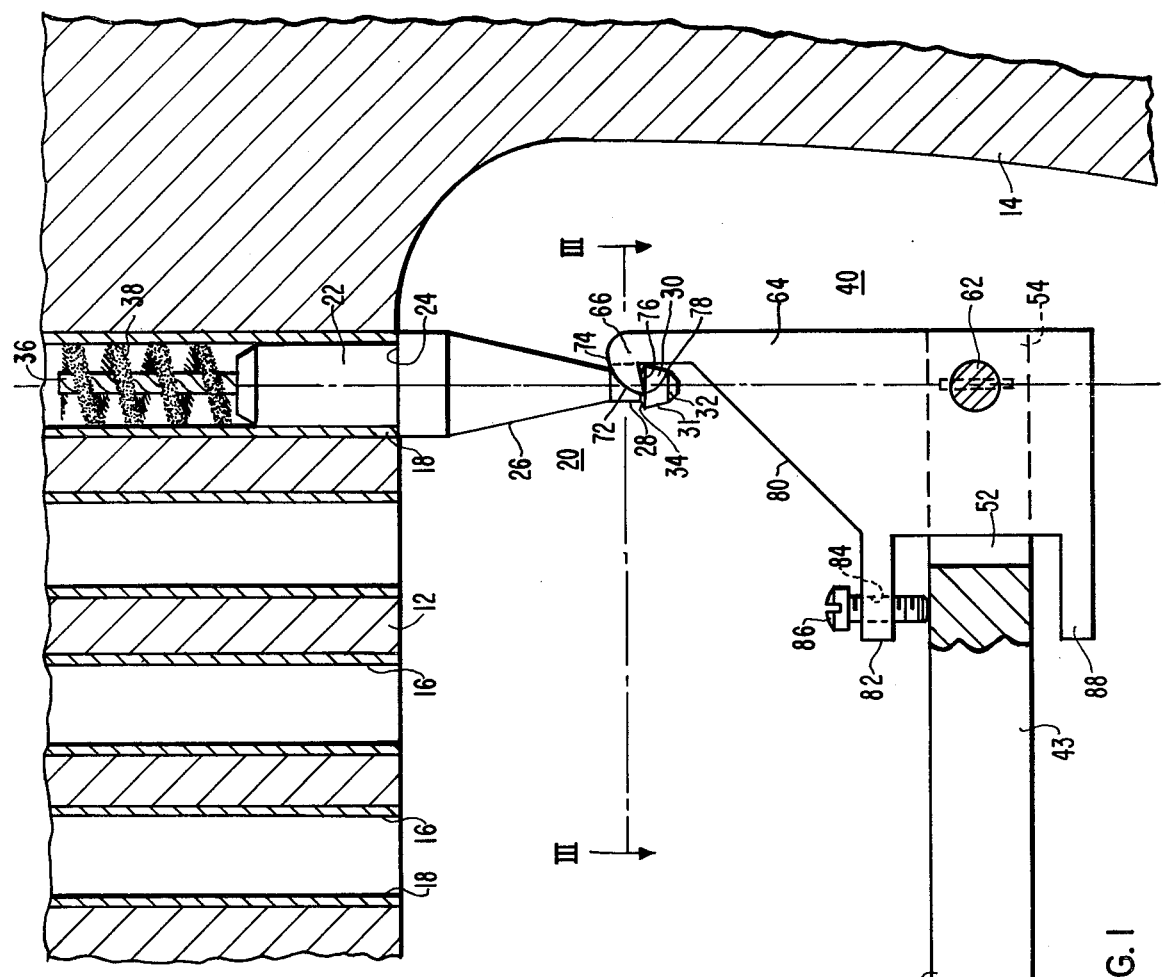
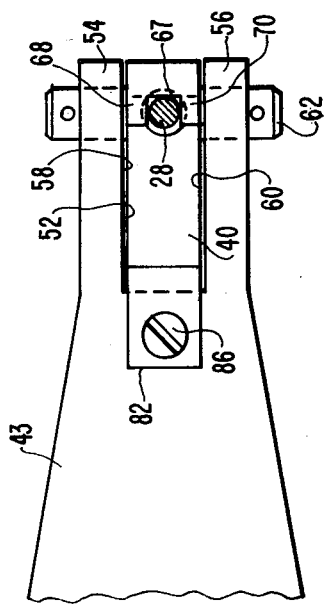
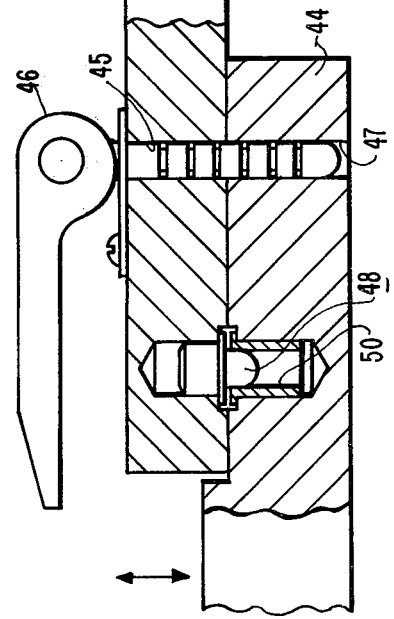
FIG. 1
FIG. 3

HEAT EXCHANGER TUBE GUIDE AND EXTRACTOR TOOL THEREFOR

BACKGROUND OF THE INVENTION

1. Field of the Invention

This invention relates to a combination tube guide and extractor tool. The guide permits proper positioning of heat exchanger tubes within a steam generator and the tool permits extraction of the guide once the tube is properly disposed. More particularly, this invention relates to such a tube guide and extractor tool for automatic remote engagement therebetween and which become readily disengaged once the tube guide is extracted from the tube.

2. Description of the Prior Art

Conical-nosed tube guides, releasably retained in the leading opening of replacement heat exchanger tubes to guide the tubes through aligned apertures in a series of support plates and ultimately into proper position within openings of a tube sheet of a stream generator are well known in the art. Also, it is known to retain the guides within the tube with bristles projecting from a central stem in a spiral configuration with the outer diameter of the spiral being larger than the inner diameter of the tube for frictional engagement therebetween. Thus, upon the tube being positioned within the tube sheet and the tube guide projecting therefrom below the tube sheet, the guide was readily manually extracted by a workman in the channel head of the generator by merely gripping the tube guide with a plier or like tool.

However in the radioactive environment of the channel head of a nuclear steam generator it is desirable to have any repair or replacement operation to the steam generator accomplished entirely from a remotely operated mechanism which does not require a workman to be within the channel head. Such a mechanism for holding and properly positioning various repairing and refurbishing tools within a nuclear steam generator is specifically described in copending application Ser. No. 888,701 of common assignee. Also copending commonly assigned application Ser. No. 896,530 shows a particular automatic remotely rotatable table for accurately positioning the tools within the channel head of a steam generator. Thus, with such capabilities it is desirable to have a tube guide and tool for use therewith that will automatically properly engage the tube guides for extraction of the guides from the tube and, upon their extraction, immediately and without fail, release the tube guide to clear the tool for engaging the next such guide for extraction.

SUMMARY OF THE INVENTION

This invention provides a particularly configured tube guide having, adjacent the outermost end of its tapered or frustoconical portion, an outwardly projecting annular shoulder having converging or frustoconical side walls forming the tip of the guide. The guide is retained within the tube by any well known means such as the previously mentioned bristles. The guide extracting tool includes a hook member for engaging opposite sides of the annular shoulder of the guide and comprises an upwardly extending portion terminating in spaced, parallel, inwardly and downwardly extending fingers forming a hook having a rounded upper surface. The tool is pivotally mounted on an extension arm of the tool holder of a remotely disposed automatic tool manipulating device with the pivot point being so related to the configuration that the tool tends to pivot clockwise (as viewed in the Figures) from its normal at-rest position. Once the tool is properly aligned below the tube guide, it is elevated to a position wherein the upper rounded surface of the fingers contact the frustoconical surface of the tip and causes the tool to pivot in opposition to its normal tendence such that upon further elevating the tool, the fingers reach a point above the shoulder where the tool is free to pivot clockwise and place the extending fingers over and engage the annular shoulder of the guide. Upon such engagement, lowering the tool pulls the guide from the tube. Once the guide is free of the tube it falls freely from the tool in that there is no wedging or gripping action, readying or clearing the tool for its engagement with another such tube guide.

DESCRIPTION OF THE DRAWINGS

FIG. 1 is a side elevational view of a portion of the channel head of a steam generator showing a tube disposed within a tube sheet and a tube guide and extracting tool, according to the present invention, disposed in engaged position prior to removal of the guide;

FIG. 3 is a cross-sectional view along line III—III of FIG. 1; and,

DESCRIPTION OF THE PREFERRED EMBODIMENT

Figure 2:
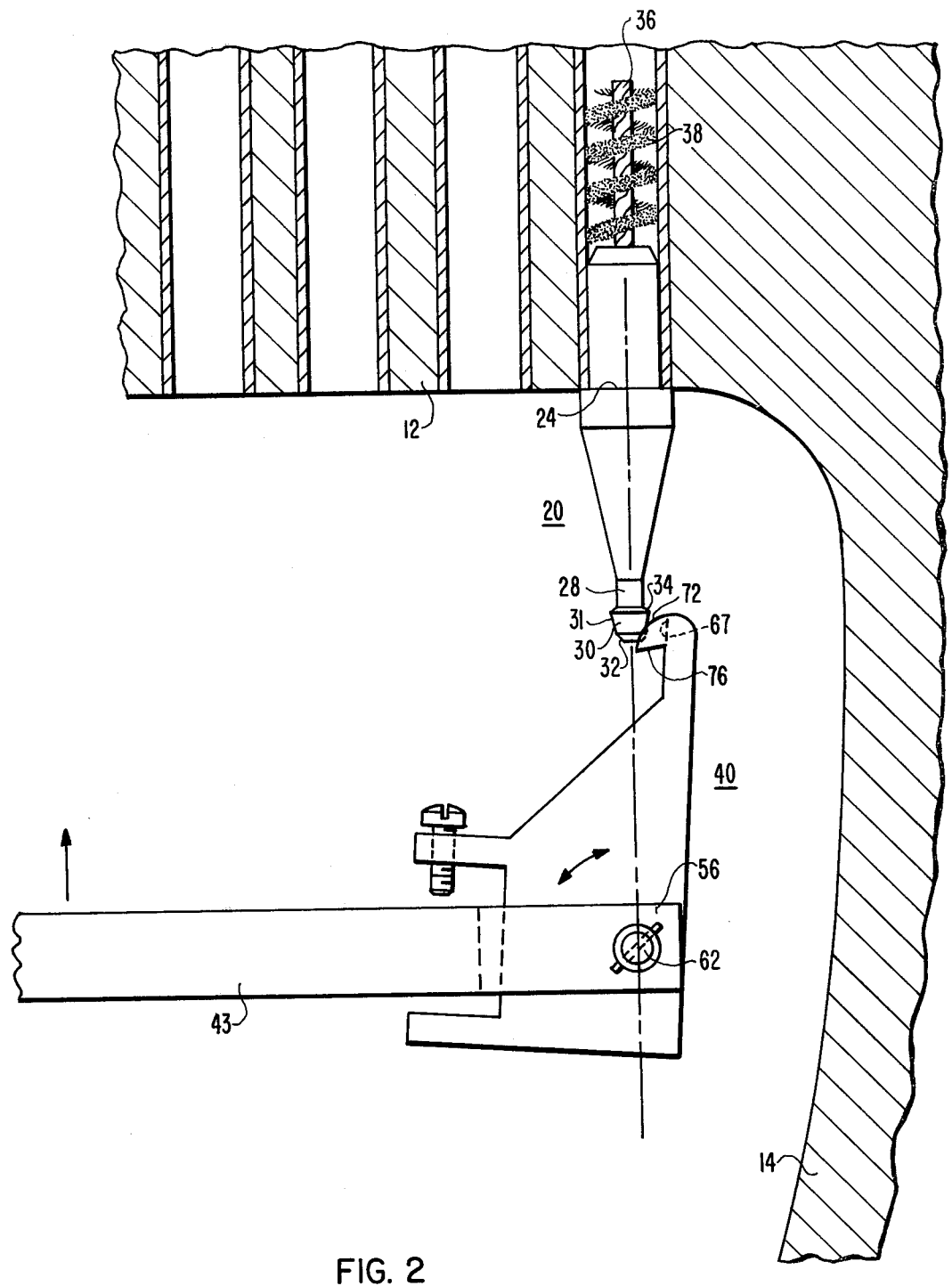
FIG. 2 is an enlarged portion of FIG. 1 showning the extractor tool in an intermediate position as it is elevated to the position of FIG. 1.
Figure 4:
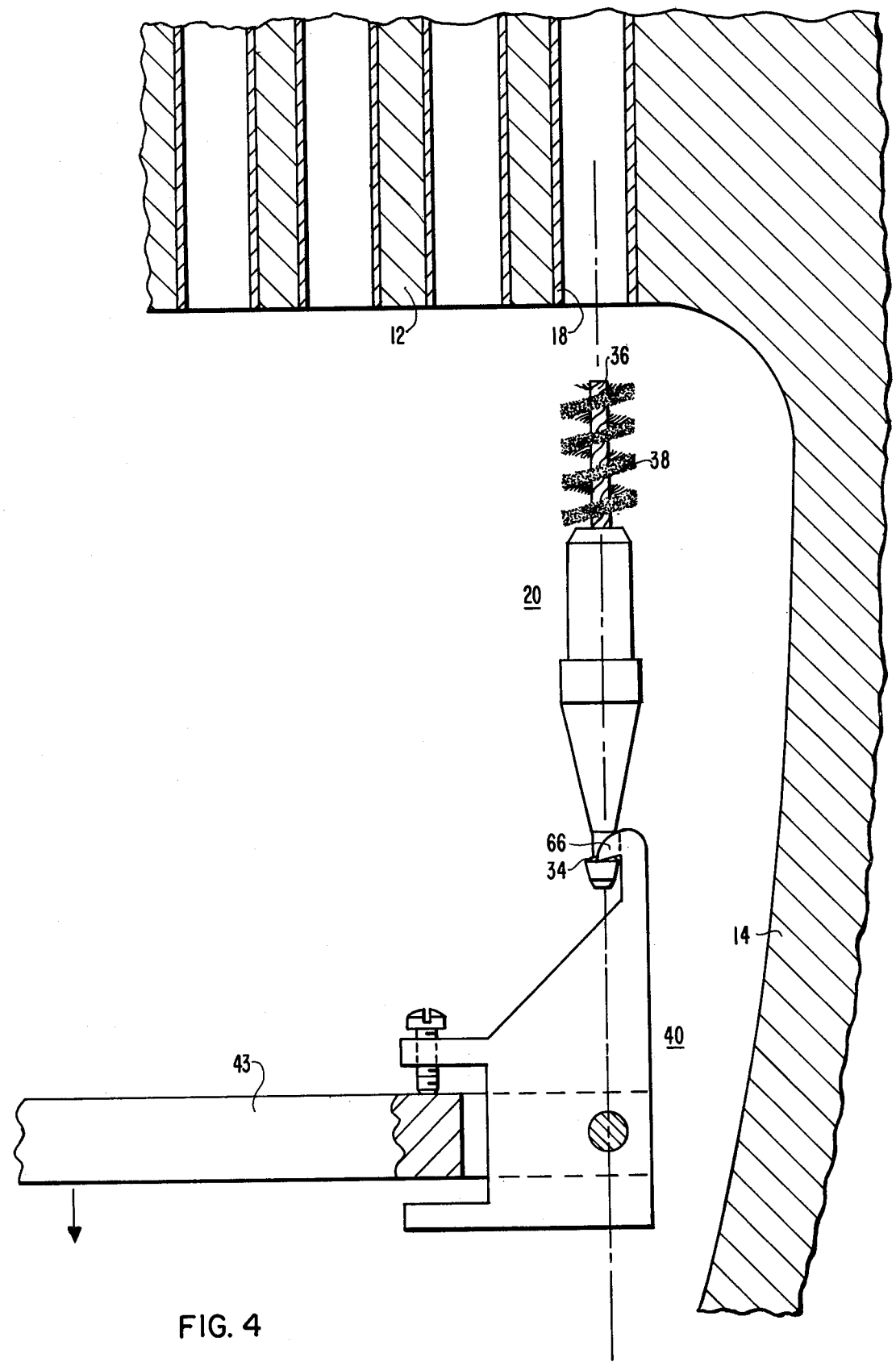
FIG. 4 is a view similar to FIG. 1 with the guide extracted form the tube.

It is to be understood that the tube guide and extraction tool of the present invention are particularly adapted to be utilized in the retubing operation of a nuclear steam generator. In such environment, it is desirable to limit the amount of exposure of personnel to the interior of the generator and thus, the repair and refurbishing operations are primarily accomplished through remotely controlled variably positionable tool support apparatus. Such a tool support apparatus is particularly described in commonly owned copending patent applications Ser. No. 888,701 and Ser. No. 896,530 each of which is herein incorporated by reference to the extent that the present invention requires a movable tool support mechanism.

Thus, referring to the Figures, a portion of the channel head of a steam generator is shown comprising a portion of the tube sheet 12 and a portion of the bottom wall 14. The tube sheet has a plurality of openings 16 therethrough in a particular pattern for receiving the open ends of a typical "U" shaped heat exchanger tube 18. As is well known in the art, the tubes 18 are lowered into position in the tube sheet 12 with the ends thereof first passing through aligned openings in a series of vertically spaced tube support plates (not shown). To assist in guiding the blunt open end of each tube through the aligned openings and into the openings 16 of the tube sheet 12 it is also well known to attach a tube guide on the end of each such tube. For the most part, tube guides are conical or bullet-nosed; however, according to the present invention, the tube guide 20 comprises an initial cylindrical portion 22, sized to closely fit within the internal diameter of the tube 18 and terminating at its lowermost end in an outwardly stepped configuration providing an annular shoulder 24 for abutment with the free end of the tube 18. The diameter of the portion of the guide defining the shoulder and the outer diameter of the tube coincide to provide a generally smooth transition therebetween to prevent the tube from catching on the support plates or the tube sheet. The tube guide is tapered downwardly inwardly from the shoulder defining portion 24 at a relatively shallow angle (i.e., on the order of 12°) to form an elongated frustoconical portion 26 terminating in a downwardly extending cylindrical stem portion 28. An outwardly stepped portion 30 having first and second tapered portions 31, 32 respectively, form the tip of the guide. It will be noted that the annular surface 34 formed by the outward stepped tip 30 is chamfered so as to be slightly angled downwardly outwardly for a purpose to be described.

the guide 20 is releasably retained within the tube 18 by any well known means such as a twisted wire stem 36 extending from the cylindrical portion 22 and having a spiraling row of bristles 38 extending outwardly therefrom to frictionally engage the inner wall of the tube 18.

An extractor tool 40 is mounted on the distal end of an extension 42 mounted on a tool holder arm 44. (The tool holder arm, as explained in the referenced copending applications, is movable both horizontally and vertically to position and move the tool as desired to accomplish the tool's function.) Quick release mounting means such as a pair of well known Expando Grip pins 46 (only one being shown) extend through aligned apertures 45, 47 in the extension and the arm, and a pair of indexing pins 48 received in mating indexing bushings 50 (also only one such pin being shown) align and retain the extension 42 for exact repositioning the extension on the arm each time the extension 42 is mounted. The extension 42 comprises a bar member 43 extending substantially horizontally and having generally planar opposed upper and lower surfaces. The distal end of the bar, as more clearly shown in FIG. 3, has an axially extending notch 52, thereby dividing the end into a pair of horizontally spaced parallel extending fingers 54, 56 having generally vertical planar facing walls 58, 60. The extracting tool 42 is retained within the notch 52 by a horizontally extending pin 62 passing through aligned apertures in the fingers and an aperture in the tool for pivotally supporting the tool within the notch 52. The tool 42 comprises a solid block-like member having a thickness less than the width of the notch 52 so as to be relatively free to pivot therewithin. The radially outermost portion of the block defines an upwardly projecting portion 64 terminating at its uppermost end in an inwardly and downwardly projecting hook portion 66. As more clearly seen in FIG. 3, the hood portion 66 is also notched as at 67 to define a pair of spaced, identical configured, hook-like projections 68, 70 having an underside or engaging surface 76 extending radially inwardly and tapered slightly downwardly.

The upper surface 72 of the hook portion 66 is rounded to provide a downwardly, inwardly extending camming surface 74 which joins the underside 76 of the hook at the radially innermost point 78.

The upper surface of the block slants downwardly-inwardly from subadjacent the hook portion 66 to terminate in a generally-horizontally extending shelf member 82 projecting in a spaced relationship over the upper surface of the extension 42. Shelf 82 has a threaded aperture 84 therethrough with a machine screw 86 received therein and extending into abutting engagement with the upper surface of the extension 42 whereby adjustment of the screw pivots the block about the pin 62 to the desired position. A lower shelf member 88 extends from the block in spaced relationship subadjacent the lower surface of the extension.

It is noted that the pin 62 on which the block pivots is disposed closely adjacent the outermost side of the block and that, due to the configuration of the block, the weight thereof is so disposed as to normally urge counterclockwise rotation (as viewed in FIG. 1) of the block about the pin 62. In the normal position this causes the screw 86 to abut the upper surface of the extension and support the block. Further, it should be pointed out that when the adjusting screw 86 is at the proper extension, a vertical line from the axis of the pin 62 intersects the hook 66 closely adjacent the hook point 78, with a portion of the point 78 extending slightly radially inwardly beyond such vertical line.

In operation, the tool 40 is properly positioned beneath the guide which extends from the tube in the tube sheet. In such position the axis of the tube 18 and guide 20 should coincide with the vertical line from the axis of the pin 62 and should also bisect the hook notch 67. In this position, elevation of the tool causes the rounded upper surface 72 thereof to contact the conical leading surfaces 32, 31 of the guide tip 30 causing the tool to rock clockwise about pin 62 to permit the hook portion 66 to pass over the guide tip 30. Once the hook tip 78 is above the annular surface 34 of the guide, the weight of the tool 40 causes it to rock counterclockwise. Thus, as more clearly seen in FIG. 3, the outer diameter of the guide tip 30 abuts the inner wall of the upwardly projecting portion 64 and the hook tip 78 extend on opposite sides of and directly over the annular surface 34 of the guide to engage this surface radially inwardly of the vertical axis. It is further noted that the hook notch 67 is sufficiently large for the cylindrical stem portin 28 of the guide to be received therein and the hook tip 78 of each finger of the hook contact the surface 34 not at diametrically opposed positions but, as previously stated inwardly beyond the axis of the guide. Such point of engagement, in conjunction with the angled surface of the annular surface 34, requires the hook tips 78 be raised to become disengaged from the guide tip 30. Because of engagement of the hook beyond the axis of the guide, and because the engagement is on the angled or chamfered surface, the hook tip engages the surfaces at a lower elevation than the elevation of the angled surface immediately behind such position. Thus, any movement of the tool radially outwardly that might cause disengagement, would also require the tool to be moved upwardly to pass over the elevated surface. Thus, as all extracting motion is downwardly and the hook is prevented from such upward movement, the hook and guide cannot become disengaged during the extraction process.

Once the guide 20 has been freed from the tube it is free to fall from the tool as there is no wedging or clamping action therebetween. In this instance, the guide is free to fall to the bottom of the channel head for subsequent removal.

As an alternative method to relying solely on the weight of the tool to pivot it counter-clockwise about the pin 62 to effect engagement with the guide 20, a coil spring can be disposed and retained between the bottom shelf 88 and the bottom surface of the extension to bias the tool into the counter-clockwise position shown.

What is claimed is:

1. An improved tube guide means for guiding tubes into apertures through the tube sheet of a steam generator and tool means for extracting said guide once said tube is properly positioned, said guide means including means for releasably retaining it within the open end of said tube and having a generally conically-nosed leading end for projecting outwardly from said tube to guide said tube through said aperture, said improvement comprising:

a tip portion on the leading end of said guide means defining an upwardly outwardly diverging frustoconical wall terminating in a cylindrical coaxial upwardly extending stem portion of less diameter than the frustoconical wall and forming an annular shoulder at the juncture of the two; and a tool means comprising a tool member pivotally supported on a tool-holder arm for rotation in a vertical plane and normally biased to rotate about said support, and means for preventing said rotational movement beyond a preset position;

said member defining an upwardly extending portion terminating in a hook portion projecting generally horizontally in the direction of the biased rotation and having a vertical notch to thereby define a pair of spaced, identical configured hooks having an upwardly facing downwardly angled surface meeting with the underside of said hooks to form the hook tips, and wherein said notch is of sufficient width to receive said cylindrical stem of said guide means with said hooks engaging said annular shoulder, and wherein said hooks extend from one side of said guide to across the axis of the guide for engagement of the hook tips on the shoulder beyond said axis; and whereby elevation of said tool means from beneath said guide means causes a camming action on said upper surface of said hook portion to pivot said tool means against the biased rotation until the underside of said hook portion is elevated to said annular shoulder whereupon said tool means pivots under the biasing influence to cause said hook tips to engage said shoulder and subsequent downward movement of said tool means extracts said guide means from said tube.

2. Structure according to claim 1 wherein the vertical axis of said guide means is in vertical alignment with the pivotal axis of said tool means.

3. Structure according to claim 2 wherein said hook portion projects generally horizontally from one side of said vertical axis to beyond said vertical axis.

4. Structure according to claim 3 wherein said generally horizontally extending undersurface of said hook portion has a slight downward angle to provide the lowermost portion of the hook at the tips.

5. Structure according to claim 4 wherein the outer wall of the tip portion of the guide means abuts the upward extending portion of the tool means having the hook portion to properly position the hook portion on said guide means.

6. Structure according to claim 4 wherein said annular shoulder is angled downwardly outwardly so that engagement on said shoulder by said hook tips beyond said axis are at opposed areas lower than diametrically opposed areas of equal separation such that said hook cannot disengage said shoulder from solely horizontal movement between said guide means and said tool means.

* * * * *